INVENTORS.
JOHN D. BOADWAY
HORACE FREEMAN.
BY Ward, Crosby & Neal
ATTORNEYS.

Dec. 17, 1957 J. D. BOADWAY ET AL 2,816,490
APPARATUS FOR TREATING LIQUID MIXTURES FOR
SEPARATION OF SOLID PARTICLES AND GASES
Filed Dec. 6, 1952 2 Sheets-Sheet 2

INVENTORS
JOHN D. BOADWAY.
HORACE FREEMAN.
BY Ward, Crosby & Neal
ATTORNEYS.

United States Patent Office 2,816,490
Patented Dec. 17, 1957

2,816,490

APPARATUS FOR TREATING LIQUID MIXTURES FOR SEPARATION OF SOLID PARTICLES AND GASES

John D. Boadway, Three Rivers, Quebec, and Horace Freeman, Cap-de-la-Madeleine, Quebec, Canada, assignors, by mesne assignments, to Nichols Engineering and Research Corporation, New York, N. Y., a corporation of Delaware Application December 6, 1952, Serial No. 324,562

3 Claims. (Cl. 92—28)

This invention relates to methods and apparatus for separating gases, vapor and undesired solid particles such as dirt, from liquids and liquid suspensions, the invention among various other possible uses being particularly adapted for the treatment of paper pulp suspensions.

In our co-pending application Serial No. 314,248, filed October 11, 1952, now abandoned, entitled, "Method and Apparatus for Separating Undesired Particles and Gases from Paper Pulp Suspensions and Other Fluids," and a continuation-in-part thereof filed concurrently herewith, Serial No. 324,561, and entitled "Method and Apparatus for Treating Pulp Suspensions and Other Fluids for Removal of Undesired Particles and Gases," there is disclosed a method and apparatus for separating dirt particles dissolved and occluded gas and bubbles from pulp suspensions and the like by maintaining a high velocity vortex of the suspension surrounding a gas core maintained under a low sub-atmospheric pressure by continuously exhausting gas therefrom, whereby dissolved gas and any occluded gas is liberated from the inner portions of the liquid of the vortex and the resulting bubbles and any bubbles originally present are flung by the action of the centrifugal force of the vortex into the core and evacuated, while the dirt particles are flung to the outer portions of the vortex, a stream of the treated suspension being continuously withdrawn from mid portions of the vortex while separately a small amount of the suspension containing the dirt particles is also continuously withdrawn from the outer portion of the vortex.

With the embodiments of the invention disclosed in the above-mentioned applications reference to which is hereby made, a suspension is introduced tangentially at one end of a cylindrical separating chamber from which the vortex travels to the remote end of such chamber and then reverses and extends back as an inner vortex to a treated stock outlet located centrally of the first end of the chamber and from which the stock is withdrawn by suction means such as a vacuum pump or barometric leg, while the gases are being exhausted through a gas outlet at the center of the remote end of the chamber by means of a vacuum pump, the dirt particles also being discharged from adjacent the periphery of the vortex at such remote end.

The present application relates to alternative embodiments of the invention of said applications, and in which the apparatus is so constructed and arranged as to discharge the treated stock as well as the dirt-containing rejected stock under pressure, and thus the gas only has to be evacuated with the use of suction means and with consequent avoidance of the liability of withdrawing any substantial amount of froth, bubbles or gas in the outgoing treated stock. The embodiments of the invention as herein disclosed also are such as to permit evacuating the gas from the vortex core either in one end thereof or preferably at both ends, so as to insure that the portions of the liquid immediately surrounding the vortex core will all be promptly subjected to a low sub-atmospheric pressure to insure thorough liberation of dissolved and occluded gas therefrom. With one example of the invention herein disclosed, the construction is such as to provide a vortex of the above-mentioned reversing nature, but in the other example hereof the construction is adapted to form a vortex which starts at one end of the separating chamber and runs to the other end thereof where both the accepted treated stock and the dirt-carrying rejected stock are expelled under pressure.

Various further and more specific objects, features and advantages of the invention will appear from the detailed description given below taken in connection with the accompanying drawings which form a part of this specification and illustrate merely by way of example, preferred forms of apparatus for the practice of the invention. The invention consists in such novel features, arrangements and combinations of parts and method steps as may be shown and described herein.

In the drawings—

Figure 1:
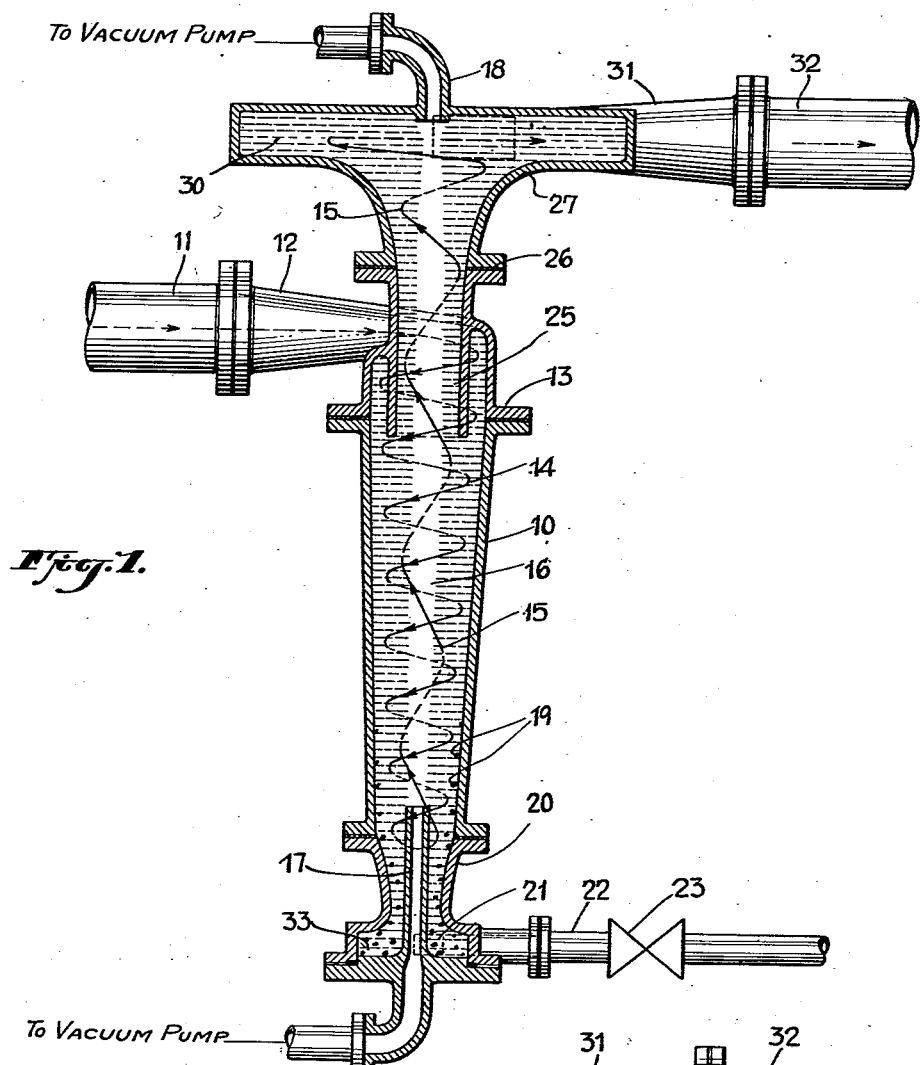
Fig. 1 is a sectional view of one of the preferred forms of the invention.

Referring now to Fig. 1 in further detail, the example of the invention here shown comprises an elongated chamber 10 of circular cross-section and preferably, although not necessarily, somewhat tapered with its smaller end at the bottom. This chamber, as shown, is preferably of a length equal to several times its diameter, but in its tapered form its length may be made somewhat shorter than in the case of the cylindrical chambers for the purpose disclosed in the above-mentioned copending applications. In the drawings the various portions of the device are illustrated approximately in their preferred relative proportions.

Figure 2:
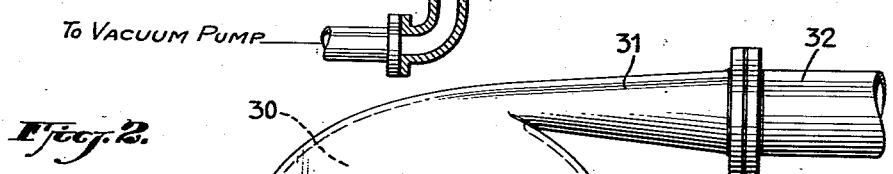
Fig. 2 is a top view of the apparatus of Fig. 1.

At the upper end of the chamber 10 an intake pipe 11 is provided having a flanged connection to an inlet or head piece 12 which in turn is detachably connected by any suitable means including if desired, flanges as at 13, to the chamber 10. (The various pairs of flanges shown in the drawings may be removably bolted together, but for simplicity in the drawings the bolts are omitted.) The head piece 12, as more clearly shown in dotted lines in Fig. 2, is shaped to inject stock to be treated generally tangentially into the chamber in a manner to cause a helical flow of the liquid mixture (as indicated by the helix 14) downwardly along the inside walls of the chamber to the region at or adjacent the lower end thereof, the helical flow or vortex then reversing and forming an inner upwardly moving vortex (as indicated by the helix 15) surrounding a substantially evacuated central core 16 which is free or substantially uniformly free of liquid. In the particular form here shown the lower end of the chamber contains an axially positioned gas outlet pipe 17 for connection, as indicated, to a vacuum pump for constantly evacuating gases and vapor from the core region 16, thus also subjecting the tubular layer of swirling liquid forming the inner vortex 15 to a low sub-atmospheric pressure throughout its length. Also, as indicated, the core 16 will extend to the top of the device where another gas outlet 18 may be provided also for connection to the vacuum pump.

Any dirt or other solid particles heavier than the liquid will be flung outwardly in the helical flow toward the interior wall surfaces of the chamber, and, as indicated at 19, toward the lower portions of the chamber such particles will have accumulated along the wall surfaces and will be carried down therealong and also along the interior wall surfaces of a bottom piece 20, and from there preferably such particles are discharged along with a small amount of the liquid through a tangential outlet 21 connected to a discharge pipe 22 having a regulating valve 23 for adjusting the rate of flow of the rejected stock containing undesired particles.

The interior of the bottom piece 20 as shown preferably is gradually restricted in diameter toward its lower portions whereby the liquid in innermost portions of the downwardly flowing vortex 14 is gradually crowded toward the gas discharge pipe 17 and thus caused to reverse its direction of flow to form the upward inner vortex 15. But further down in the bottom piece 20 near the tangential outlet 21 this member is enlarged substantially in internal diameter for reasons which will be hereinafter explained.

The treated stock embodied largely within the upwardly flowing inner vortex is allowed to pass up through a central passage 25 in the head piece 12, the wall surrounding this passage at the upper end thereof having a flanged connection as at 26 to a top chamber member 27. Thus as indicated, the inner upward vortex 15 is allowed to travel up into the top chamber 27 which as shown, is so shaped as to permit this inner vortex to quickly expand in diameter, and then enter a disk-shaped cavity 30, which cavity is preferably a number of times larger in diameter than the lower portions of the upward vortex and for a purpose hereinafter explained. The treated stock is finally discharged tangentially from the cavity 30 through a passage 31 preferably of expanding diameter connected to a pipe 32 for carrying away the stock.

In order to insure formation of vortexes in the chamber 10 which will have a gas core of substantial size therein continuously and reliably maintained, it is important if the vortexes are to be established by the use of a tangential inlet, (or by the use of suitable vanes, as has sometimes been proposed for vortex separators) to so shape such inlet parts that a substantial portion of the pressure energy (pressure head) of the introduced stream will be converted into kinetic energy (velocity head), thereby imparting sufficient velocity to the liquid to insure maintenance of the desired central core and at the same time greatly enhancing the sedimentation efficiency of the vortexes, since such efficiency varies as the square of the velocity and inversely as the qauntity of the flow. In the usual case, if the inlet 12 is simply so made as to restrict the cross-sectional area of the introduced stream to about 15%, the desired vortex formation will occur with the construction shown; but the restriction should not be great enough to cause the vortex layers of liquid to be too thin on the inside walls of the chamber 10 and whereby the liquid will pass through the chamber too rapidly to permit thorough liberation of the dissolved and occluded gases and insure separation of the undesired particles.

As the outer vortex proceeds downwardly in the chamber 10, and if such chamber is formed with a slight taper as shown, the circumferential velocity in the vortex will gradually increase, insuring that the undesired heavier particles will be more and more forcefully thrown outwardly while the bubbles which were originally in the liquid or are formed of gases liberated from solution or occlusion are forcefully flung into the inner upward vortex. And some of the inner portions of the outer vortex which have become free of dirt and bubbles will be crowded into the upward inner vortex; and as the outer vortex proceeds down into the still more restricted bottom piece 20, the remaining inner portions of the downward vortex will be reversed and travel upwardly as the inner vortex while only the outer portions of the downward vortex will continue and swirl around in the substantially disk-shaped chamber portion 33 of larger diameter in the bottom piece. The effect in this chamber will thus be to reconvert a substantial part of the kinetic energy of the dirt-containing stock back into pressure energy around the periphery of the chamber portion 33 so that the rejected stock then passes out through the tangential outlet 21 under sufficient positive pressure, so that no pumping means is required to convey same to equipment for secondary treatment or to the desired point of discharge.

At the top of the device as the treated stock in the upward high velocity vortex 15 enters the expanding portions of the top piece 27, its kinetic energy will rapidly be converted back to pressure energy, and as the stock swirls around to the periphery of the disk-shaped chamber 30 its velocity will decrease and its pressure will increase to a pressure comparable in magnitude (except for friction losses) to that of the incoming stock in the intake pipe 11, and thus as the treated stock passes out through the tangential outlet 31 and the cross-section of the stream expands still more in such outlet, the substantially gas free stock will then be under such pressure that it can readily be conducted to the desired point of use without further pumping in the usual case; and by forming the top piece 27 with the chamber therein shaped as shown, maintenance of the central gas core clear up to the gas discharge pipe 18 will be insured.

With the unidirectional type vortex as occurs in the device of Figs. 1 and 2, it will be apparent that the outer and downwardly flowing vortex, in which the pressure is greatest, serves essentially to remove the undesired heavier particles which are forced to the periphery of the vortex and also any bubbles which may originally be present in the mixture and which are forced inwardly into the inner upward vortex. On the other hand, the inner upward vortex serves essentially to separate the dissolved and occluded gases from the mixture because in such upward vortex the pressure is much lower, not only because of the restricted cross-sectional area of the vortex (the pressure energy having been here largely converted into kinetic energy), but also because of the fact that the core 16 is maintained evacuated under a low subatmospheric pressure, for example 4–8 cms. Hg absolute.

Figure 3:
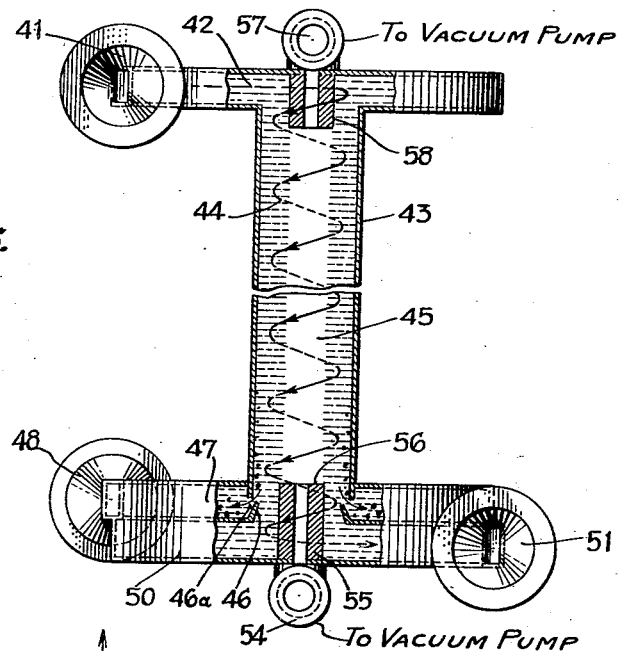
Fig. 3 is an elevational view, partly in section, of an alternative embodiment of the invention.
Figure 4:
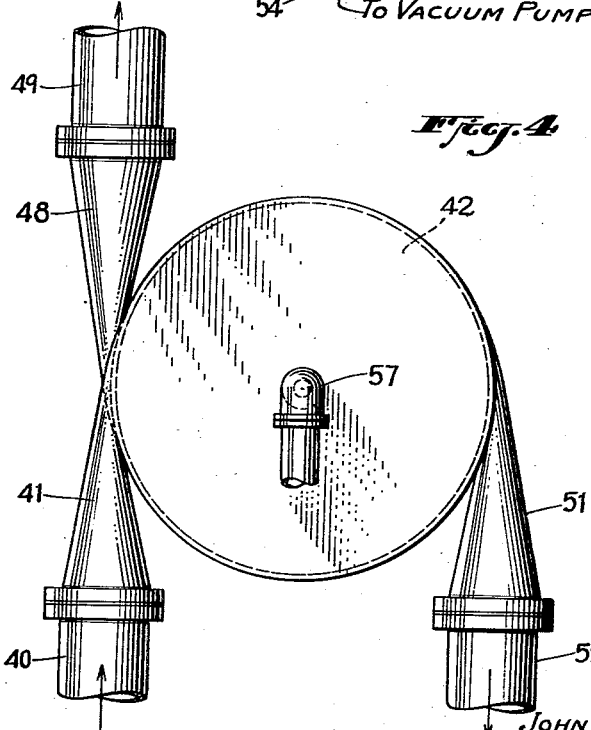
Fig. 4 is a top view of the apparatus of Fig. 3.

However, in the form of the invention shown in Figs. 3 and 4, a vortex is maintained in a form which starts at one end of the separation chamber and flows out from the other end without reversing its direction, and with this form of vortex, the mixture or suspension is subject to simultaneous removal of the dirt or heavier particles, and the liberation and separation of the gases including the dissolved and occluded gases. If the separation chamber is made relatively elongated, both degasification and dirt removal may be efficiently accomplished simultaneously with this form of unidirectional vortex, although where it is desired to utilize the gas content to flotate some particles (such as pulp fibers) while removing others during the dirt removal, the reversing type of vortex is to be preferred.

Referring now to the device of Figs. 3 and 4 in further detail, the liquid or stock to be treated is supplied through an intake pipe 40 to a restricted inlet 41 which causes the mixture to be projected tangentially into the periphery of a disc-like chamber 42. As in the case of the inlet connection 12 of Fig. 1, the restricted inlet 41 causes a substantial part of the pressure energy to be converted into velocity energy and as the high velocity mixture enters the disc-shaped chamber 42, it spirals (equiangularly) as a free vortex in which the pressure energy is still further converted into velocity energy as the liquid or mixture enters the upper end of an elongated separated chamber 43 of circular cross-section. (This chamber may be cylindrical as shown in Fig. 3, or somewhat tapered as in the case of Fig. 1.) The liquid then follows down the wall of the chamber 43 in a helical path and at such high velocity as to leave a gas core 45. Dirt or other relatively heavy particles to be separated are thrown to the chamber wall and carried down to the bottom end thereof where they are skimmed off by a slightly projecting annular doctor blade formation as at 46 and pass out along with a small amount of the liquid through an annular opening or slot 46a into a disc-shaped chamber 47. In this chamber, as the liquid therein swirls about and progresses to the periphery, velocity energy thereof becomes reconverted to pressure energy and finally the dirt with a small amount of the liquid carrying same is discharged tangentially through an expanding outlet 48 and through a discharge pipe 49 which may have a control valve, as in the case of the discharge pipe 22 of Fig. 1. Meanwhile the cleaned stock which is passed by the doctor 46 continues down and swirls into a disk-shaped chamber 50, and around within the fringe of this chamber, sufficient pressure will be established by reconversion of velocity energy to pressure energy, so that the treated stock is discharged tangentially through an expanding outlet 51 and through pipe 52 at a positive pressure comparable in magnitude to the pressure within the inlet pipe 40.

Either one or (as shown) both ends of the core 45 are connected to gas outlet pipes as at 54, 57 running to a vacuum pump or pumps, which act constantly to maintain the core 47 under a low subatmospheric pressure as in the case of Fig. 1. The ends as at 56 and 58 of these gas outlets preferably protrude into the two ends of the core respectively and the end surfaces thereof as shown are preferably relatively thick so as to provide gas oulet apertures sufficiently small to permit exit of gas alone to the vacuum system, and yet be surrounded by an annular surface of sufficient width to prevent passage of gas exteriorly of such end surfaces.

Although the two embodiments of the invention are illustrated in the drawings in upright positions with the intakes at the top and dirt discharge outlets at the bottom, such devices may, if desired, be placed in various other positions, or even be inverted, without interfering with the proper action of the vortices therein, because the velocity of the liquid in the vortices is so high and the resulting centrifugal forces so large, that, by comparison, the effect of gravity on the mixture or components thereof is relatively unimportant. Accordingly where reference herein is made to the top or bottom portions of such devices, it will be understood that such terms are used merely for convenience in referring to the devices in the positions shown, and are not intended to limit the scope of the invention to devices necessarily positioned upright as shown.

Although certain particular embodiments of the invention are herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for separating gas and solid particles from liquid, comprising an elongated chamber having a body portion of circular internal cross-section, a restricting liquid inlet means so shaped and positioned as to convert a substantial part of the pressure energy of the incoming liquid to rotational velocity energy to maintain a helical flow about the inside walls of said chamber, a liquid outlet concentric with and at an end of said chamber and providing an outlet opening of a size permitting passage therethrough of the greater portion of said helical flow, said outlet including a generally disk-shaped chamber in which the liquid is free to form a swirling body of increasing diameter, a discharge opening also being provided at the periphery of such disk-shaped chamber, a gas outlet also concentric with said elongated chamber but having an outlet opening of a diameter smaller than said liquid outlet opening, means providing suction for evacuating gas through said gas outlet and to thereby maintain a central evacuated core in said helical flow, and a small outlet for discharging a part of said flow with the solid particles therein from the outer portion of the helical flow at a point spaced substantially from the inlet, said disk-shaped chamber acting to permit sufficient of the velocity energy of the liquid therein to be reconverted to pressure energy whereby the treated liquid at said discharge opening will have a substantial positive pressure despite the said sub-atmospheric pressure of said core.

2. Apparatus for separating gas and solid particles from liquid, comprising: an elongated chamber having a body portion of circular internal cross-section; a restricting liquid inlet means so shaped and positioned as to convert a substantial part of the pressure energy of the incoming liquid to rotational velocity energy to maintain a helical flow about the inside walls of said chamber; a liquid outlet concentric with and at an end of said chamber and providing an outlet opening of a size permitting passage therethrough of the greater portion of said helical flow, said outlet including a generally disk-shaped chamber in which the liquid is free to form a swirling body of increasing diameter, a discharge opening also being provided at the periphery of such disk-shaped chamber; gas outlets concentric respectively with both ends of said elongated chamber but having openings of a size smaller than said liquid outlet opening; means providing suction for evacuating gas through said gas outlets and to thereby maintain a central evacuated core in said helical flow; and a small outlet for discharging a part of said flow with the solid particles therein from the outer portion of the helical flow at a point spaced substantially from the inlet, said disk-shaped chamber acting to permit sufficient of the velocity energy of the liquid therein to be reconverted to pressure energy whereby the treated liquid at said discharge opening will have a substantial positive pressure despite the said sub-atmospheric pressure of said core.

3. Apparatus for separating gas from liquid, comprising an elongated chamber having a body portion of circular internal cross section, a liquid inlet means at one end of said chamber shaped to convert a sufficient part of the pressure energy of the incoming liquid into rotational velocity energy to maintain a helical flow of the liquid about the inside walls of the chamber of a velocity causing maintenance of a defined hollow core, said helical flow extending from said inlet end of the chamber to the other end thereof, such other end of the chamber being so shaped that such helical flow will then be reversed and returned centrally about the core to the inlet end as an inner vortex, a liquid outlet concentric with and at the inlet end of said chamber, such outlet providing an opening of a size permitting passage therethrough of the liquid of said inner vortex, a substantially disk-shaped chamber concentric with and into which said liquid outlet communicates, gas outlet means at least at one end of said elongated chamber and concentric therewith and of a diameter smaller than said liquid outlet, and means connected to said gas outlet means for constantly evacuating gas to maintain said core under subatmospheric pressure, said disk-shaped chamber comprising means permitting the liquid from the liquid outlet to form a swirling body of increasing diameter in which velocity energy of the liquid is converted to pressure energy whereby the liquid may be discharged from the periphery of said disk-shaped chamber at a substantially positive pressure despite the sub-atmospheric pressure in said core.

References Cited in the file of this patent

UNITED STATES PATENTS

| Number | Name | Date |
| --- | --- | --- |
| 1,766,666 | Meyer | June 24, 1930 |
| 2,102,525 | Freeman | Dec. 14, 1937 |
| 2,187,646 | Darrieus | Jan. 16, 1940 |
| 2,346,005 | Bryson | Apr. 4, 1944 |
| 2,571,219 | De Cew | Oct. 16, 1951 |